United States Patent
Lafford et al.

(12)

(10) Patent No.: US 12,423,597 B2
(45) Date of Patent: Sep. 23, 2025

(54) PREDICTION CIRCUITRY CONFIGURED TO PREDICT SPECULATIVE ACTION BASED ON HIT-TO-TRAIN RATIO OR BASED ON TRAIN COUNTER AND HIT COUNTER

(71) Applicant: Arm Limited, Cambridge (GB)

(72) Inventors: Devin Lafford, Austin, TX (US); Alexander Cole Shulyak, Austin, TX (US); Joseph Michael Pusdesris, Austin, TX (US); Jacob Martin DeGasperis, Austin, TX (US)

(73) Assignee: Arm Limited, Cambridge (GB)

( * ) Notice: Subject to any disclaimer, the term of this patent is extended or adjusted under 35 U.S.C. 154(b) by 1282 days.

(21) Appl. No.: 17/155,665

(22) Filed: Jan. 22, 2021

(65) Prior Publication Data

US 2022/0237478 A1    Jul. 28, 2022

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
CPC .................................. G06N 5/04; G06N 20/00
See application file for complete search history.

(56) References Cited

PUBLICATIONS

Lai, An-Chow, Cem Fide, and Babak Falsafi. "Dead-block prediction & dead-block correlating prefetchers." ACM SIGARCH Computer Architecture News 29.2 (2001): 144-154. (Year: 2001).*
Deb, Dipika, John Jose, and Maurizio Palesi. "COPE: Reducing Cache Pollution and Network Contention by Inter-tile Coordinated Prefetching in NoC-based MPSoCs." ACM Transactions on Design Automation of Electronic Systems (TODAES) 26.3 (2020): 1-31. (Year: 2020).*
Lis, Mieszko Norbert. Hardware-level fine-grained thread migration. Diss. Massachusetts Institute of Technology, 2014. (Year: 2014).*

* cited by examiner

*Primary Examiner* — Kevin W Figueroa
(74) *Attorney, Agent, or Firm* — NIXON & VANDERHYE P.C.

(57) ABSTRACT

An apparatus comprises processing circuitry to perform data processing in response to instructions; prediction state storage circuitry to store prediction state information; prediction state training circuitry to train the prediction state information in response to events detected during processing of instructions by the processing circuitry; and prediction circuitry to predict, based on the prediction state information, a given speculative action to be performed in response to a given prediction trigger event; in which: the prediction circuitry varies, based on one or more current system resource conditions of the apparatus, at least one action selection criterion used to select which speculative action is to be performed.

18 Claims, 8 Drawing Sheets

| Event | Train Count T(76) | Hit Count H (80) | System Constraint | Skew Pair A:B | Skewed Train T*A | Skewed Hit H*B | Generate Prefetch? |
|---|---|---|---|---|---|---|---|
| ... | 2 | 1 | 25% | 1:4 | 2 | 4 | Yes |
| System becomes constrained | 2 | 1 | 50% | 1:2 | 2 | 2 | Yes |
| System becomes more constrained | 2 | 1 | 75% | 3:4 | 6 | 4 | No |
| Prefetcher sees a hit on this entry | 2 | 2 | 75% | 3:4 | 6 | 8 | Yes |
| System becomes more constrained | 2 | 2 | 100% | 1:1 | 2 | 2 | Yes |
| Prefetcher train, no hit | 3 | 2 | 100% | 1:1 | 3 | 2 | No |
| System becomes less constrained | 3 | 2 | 50% | 1:2 | 3 | 4 | Yes |

PREDICTION CIRCUITRY CONFIGURED TO PREDICT SPECULATIVE ACTION BASED ON HIT-TO-TRAIN RATIO OR BASED ON TRAIN COUNTER AND HIT COUNTER

BACKGROUND

Technical Field

The present technique relates to the field of data processing.

Technical Background

Processing circuitry performs data processing in response to instructions. Prediction circuitry may be provided to predict whether a speculative action should be performed. The prediction may be based on prediction state information trained using previous events detected during processing of instructions by the processing circuitry. By initiating a speculative action based on the prediction, before it is known for certain whether the action is required, this can reduce delays that would otherwise be incurred if the action was only triggered once it is known to be required. This helps to improve performance.

SUMMARY

At least some examples provide an apparatus comprising: processing circuitry to perform data processing in response to instructions; prediction state storage circuitry to store prediction state information; prediction state training circuitry to train the prediction state information in response to events detected during processing of instructions by the processing circuitry; and prediction circuitry to predict, based on the prediction state information, a given speculative action to be performed in response to a given prediction trigger event; in which: the prediction circuitry is configured to vary, based on one or more current system resource conditions of the apparatus, at least one action selection criterion used to select which speculative action is to be performed.

At least some examples provide an apparatus comprising: means for performing data processing in response to instructions; means for storing prediction state information; means for training the prediction state information in response to events detected during processing of instructions by the means for performing data processing; and means for predicting, based on the prediction state information, a given speculative action to be performed in response to a given prediction trigger event; in which: the means for predicting is configured to vary, based on one or more current system resource conditions of the apparatus, at least one action selection criterion used to select which speculative action is to be performed.

At least some examples provide a method comprising: performing data processing in response to instructions; training prediction state information stored by prediction state storage circuitry in response to events detected during processing of the instructions; predicting, based on the prediction state information, a given speculative action to be performed in response to a given prediction trigger event; and varying, based on one or more current system resource conditions, at least one action selection criterion used to select which speculative action is to be performed.

Further aspects, features and advantages of the present technique will be apparent from the following description of examples, which is to be read in conjunction with the accompanying drawings.

DESCRIPTION OF EXAMPLES

Figure 1:
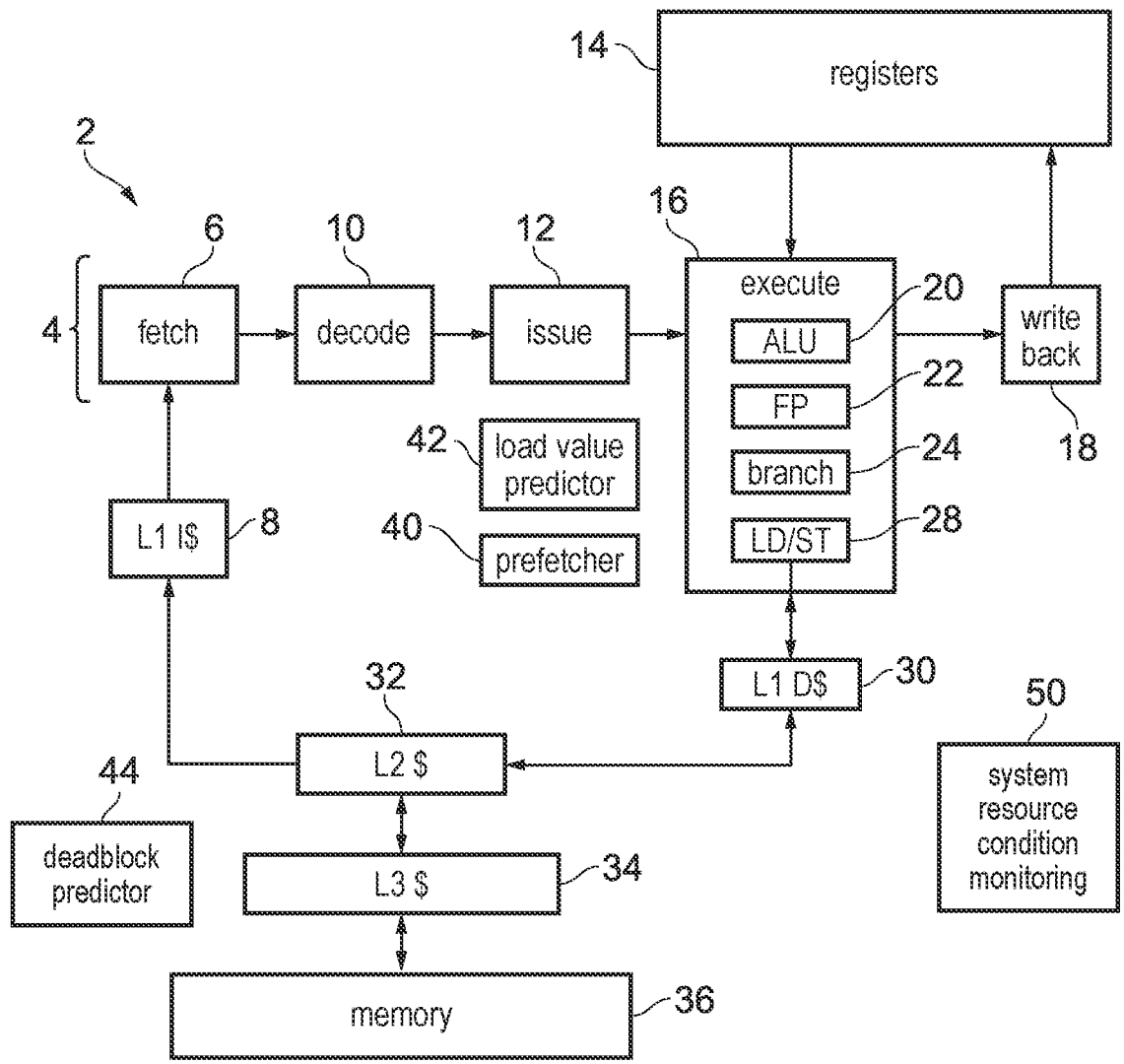
FIG. 1 schematically illustrates a data processing system having at least one prediction mechanism.

An apparatus comprises processing circuitry to perform data processing in response to instructions, prediction state storage circuitry to store prediction state information, prediction state training circuitry to train the prediction state information in response to events detected during processing of instructions by the processing circuitry, and prediction circuitry to predict, based on the prediction state information, a given speculative action to be performed in response to a given prediction trigger event. Hence, by learning from events detected during processing, predictions can be made as to speculative actions which could help to improve performance.

In the examples below, the prediction circuitry varies, based on one or more current system resource conditions of the apparatus, at least one action selection criterion used to select which speculative action is to be performed (in some examples, the action selection criterion may also be used to select whether a speculative action is to be performed). By providing a degree of reactivity to system constraints, this helps to address a problem of overconfidence or underconfidence in predictions which may affect some prediction mechanisms.

Many prediction mechanisms may take some time to establish a level of confidence in a particular prediction. If training times are relatively long, then there may be a number of predictions indicated in the prediction state information for which confidence is either too high or too low for a time. This may create a problem, as overconfidence in a relatively useless prediction may waste system resource while underconfidence in a useful prediction may leave performance on the table. These problems may be exacerbated by the fact that the availability of system resource may change many times in the time taken for the prediction state training circuitry to gain or lose confidence in a particular prediction.

The inventors recognised that these problems can be mitigated by varying at least one action selection criterion used to select which speculative action is to be performed, with the criterion being varied based on one or more current system resource conditions of the apparatus. As the action selection criterion or criteria used to select which actions justify being performed speculatively are varied based on the current system resource conditions, this means that longer training times can be tolerated and overconfident predictions may be less likely to impact on system resource available to other non-speculative actions.

In particular, when determining the one or more action selection criteria to apply, the system resource conditions are evaluated at the time of making the prediction, rather than at the time of training the prediction state information. This can be useful because there may be many changes of system resource conditions occurring between the time when the prediction state information was set and the time when the prediction state information is used to make a prediction. Hence, by considering current system resource conditions and using these to adapt the selection criterion or criteria to apply at the time of making the prediction, the prediction mechanism may incorporate a much higher degree of reactivity to system resource constraints without needing retraining of the prediction state information.

In one example, the prediction circuitry may vary the at least one action selection criterion to apply a more relaxed action selection criterion when the one or more current system resource conditions indicate greater system resource availability than when the one or more current system resource conditions indicate less system resource availability. Hence, the prediction circuitry may apply more aggressive predictions when system resource availability is high than when system resource availability is tightly constrained. For example, certain predictions which have not yet established as high a level of confidence may be more likely to be triggered when system resource availability is high than when system resource availability is low, so that this avoids overconfident predictions wasting valuable system resource when resource availability is scarce. For example, when there is little spare resource available then the prediction circuitry may require a greater level of confidence than when there is plenty of resource available. This approach may be useful for prediction mechanisms such as prefetchers for which the speculative action uses up some of a finite amount of resource available, so at times of high constraint it may be preferable for the prediction mechanism not to initiate the speculative actions as often.

However, there may also be some types of prediction mechanism for which the opposite approach could be useful, so that when current system resource conditions indicate less system resource availability, a more relaxed action selection criterion is applied than when current system resource conditions indicate greater system resource availability. For example, for a deadblock predictor which predicts whether victim data evicted from one level of cache may not be needed again and so can be suppressed from being allocated into a further level of cache, the speculative action may be the decision not to allocate the victim data into the further level of cache (deviating from the normal approach of allocating data into that cache on eviction from the previous level). If cache utilisation is high, the deadblock prediction may wish to become more aggressive in its predictions, making it more likely that it predicts that victim data evicted from the previous level cache will not be needed again. When cache utilisation is low, it may be that there is less pressure on occupancy in the further level of cache, so that there is less need to deviate from the normal approach of allocating data evicted from the previous level into the further level of cache.

In one example the action selection criterion may comprise whether a confidence metric represented by the prediction state information exceeds a confidence threshold. The prediction circuitry may vary the confidence threshold based on the one or more current system resource conditions. For example, the confidence threshold may be set to a value which indicates a higher degree of confidence when system resource availability is scarce compared to when system resource availability is more plentiful. By adjusting the confidence threshold based on current system resource conditions then this provides a better balance between performance and system resource utilisation.

In one example the confidence metric used to determine whether to perform a given speculative action in response to a given prediction trigger event may be indicative of a hit-to-train ratio of a number of prediction hits to a number of prediction training opportunities. A "prediction training opportunity" refers to an instance of detecting the given prediction trigger event when detection of the given prediction trigger event causes the prediction state training circuitry to monitor events subsequent to the given prediction trigger event for training of prediction state information associated with the given prediction trigger event. A "prediction hit" refers to one of the prediction training opportunities for which the prediction state training circuitry, when monitoring the events subsequent to the given prediction trigger event, detected an event associated with the given speculative action (e.g. an event indicating that it would have been beneficial to have performed the given speculative action in response to the prediction trigger event). Recording information regarding the hit-to-train ratio can be useful as, compared to a simple confidence counter which is incremented on a prediction hit and decremented on a prediction miss when a prediction training opportunity passes without a prediction hit being detected, the hit-to-train ratio can provide a better indication of the estimated prediction success rate for a given speculative action, making it easier to consider current level of resource availability when deciding whether the estimated prediction success rate justifies using up valuable resource.

The prediction state information could represent the hit-to-train ratio in a number of ways. One example is using a train counter to count the number of prediction training opportunities and a hit counter to count the number of prediction hits, which will be discussed further below. However it is also possible to represent the hit-to-train ratio in other ways. For example, instead of counting the total number of prediction training opportunities, another approach could be to provide a prediction miss counter which counts prediction misses (when one of the prediction training opportunities occurs and monitoring of subsequent events fails to detect an event associated with a given speculative action which is indicative of a prediction hit). Tracking a prediction hit count and a prediction miss count would enable the hit-to-train ratio to be calculated based on the ratio between the prediction hit counter value and the total of the prediction hit counter value and the prediction miss counter value. Hence, in general, the prediction state information may specify any information which enables the hit-to-train ratio to be determined.

Also, it will be appreciated that in some cases the hit-to-train ratio may be indicated imprecisely by the prediction state information. For example counters may be used which have a limited number of bits, so the counters may saturate at a certain maximum value, and so there can be some inaccuracy due to saturation or rounding errors.

Another example of an action selection criterion (used to determine whether to trigger a given speculative action when a given prediction trigger event occurs) may be to determine whether a lookahead depth associated with the speculative action is greater than a lookahead depth threshold. The lookahead depth may be an indication of how far ahead of the current point of data processing is the point of processing at which the speculative action is expected to provide a benefit. If the speculative action relates to a point of data processing far into the future then it may be more likely that an intervening event may occur which means that the speculative action turns out not to be needed. Hence, the prediction circuitry may vary the lookahead depth threshold based on the one or more current system resource conditions. In particular, the prediction circuitry could select a shorter lookahead depth threshold when the current system resource conditions indicate less system resource availability than when the current system resource conditions indicate greater system resource availability. By increasing the lookahead depth when system resource availability is plentiful this increases the aggressiveness of the predictions and can provide opportunities for increased performance, but by decreasing the lookahead depth when system resource availability is more scarce then this reduces the chance that an overly confident prediction wastes system resource in a scenario where system resource is at a premium. For example, in a stride-based prefetcher, the lookahead depth could indicate the number of iterations of a stride value applied to a current memory address to obtain the target address of a prefetch request to be issued. If the threshold is higher, then a greater number of prefetch requests will be issued extending a greater distance into the future when following the stride pattern of incrementing the current memory address at intervals of the stride value. Hence, the number of iterations applied for a recursive prefetch could be set higher at times of greater system resource availability than at times of less system resource availability.

In one example the prediction state information may comprise, for the given prediction trigger event and the given speculative action: a train counter indicative of a number of prediction training opportunities associated with the given prediction trigger event, the prediction training opportunities comprising instances of detecting the given prediction trigger event when detection of the given prediction trigger event causes the prediction state training circuitry to monitor events subsequent to the given prediction trigger event for training of prediction state information associated with the given prediction trigger event; and a hit counter indicative of a number of prediction hits, each prediction hit comprising one of the prediction training opportunities for which the prediction state training circuitry, when monitoring the events subsequent to the given prediction trigger event, detected an event associated with the given speculative action. Different pairs of train counter and hit counter may be established for different pairs of prediction trigger events and speculative actions. The train counter and the hit counter for a given prediction trigger event and a given speculative action may be used to decide, when the given prediction trigger event occurs, whether to perform the given speculative action. As mentioned earlier the train counter and the hit counter can be one way of characterising a hit-to-train ratio which can be a useful measure for evaluating whether the chance of a successful prediction means initiating the speculative action is justified given the current system resource conditions. Hence, although maintenance of the train counter and the hit counter may require greater storage overhead and circuit logic overhead compared to maintenance of a simple confidence counter, a benefit is that this can enable much greater degree of reactivity to external system constraints.

In response to the given prediction trigger event, the prediction circuitry may predict whether to perform a given speculative action based on whether a skewed hit counter is greater than a skewed train counter. The skewed hit counter may correspond to a product of a first skew value and the hit counter associated with a given speculative event, and the skewed train counter may correspond to a product of a second skew value and the train counter associated with a given prediction trigger event. Effectively, this enables a comparison of whether the hit-to-train ratio represented by the hit and train counters is greater than a ratio threshold provided as the confidence threshold for establishing whether the action selection criteria are satisfied. For example the ratio threshold may effectively be equivalent to the ratio of the second skew value to the first skew value. The given speculative action may be determined to be performed in the case when the skewed hit counter is greater than the skewed train counter. In some examples the action may also be performed if the skewed hit counter is equal to the skewed train counter (or alternatively the case when the skewed hit counter is equal to the skewed train counter could lead to the speculative action not being performed, in an implementation which is more conservative at initiating the speculative action). When the skewed hit counter is greater than the skewed train counter then this indicates that the hit-to-train ratio is greater than the threshold ratio represented by the second skew value divided by the first skew value, so that the prediction success rate may be deemed to be high enough to justify initiating the speculative action.

The first skew value and the second skew value may be selected based on the one or more current system resource conditions, so as to adjust the threshold ratio at which the speculative action is initiated. The selection of the first and second skew values may be made at the time of making the prediction rather than at the time of training the prediction state, which means that the predictor is able to react fast to multiple changes of external system constraints occurring between successive updates of the prediction state information. Hence, even for exactly the same values of the prediction state information, the decision on whether to initiate the speculative action may vary depending on system resource conditions. Different pairs of first and second skew values may be established to represent different thresholds which may be selected based on the current system resource conditions.

It will be appreciated that when evaluating the skewed hit counter and the skewed train counter, while the skewed hit and train counters represent the products of the first/second skew value and the hit/train counters respectively, there may be a number of options for operations which can be used to identify the values of the skewed hit and train counters. In one example the skewed hit counter may be determined by actually multiplying the hit counter with the first skew value, and similarly the skewed train counter may also be determined by multiplying the second skew value with the train counter. However, it may also be possible to generate the skewed hit and train counters through other operations. For example, a shift could be used to implement a multiplication by a power of two. Hence, it will be appreciated that it is not necessarily essential to actually perform a multiplication to evaluate the products for the skewed hit counter and skewed train counter.

The number of bits used for the train counter and the hit counter may vary depending on implementation choice. Some implementations may choose to provide counters with greater precision than others. However, in practice, the total amount of prediction state may grow with the number of bits used for each counter, and so the system designer may wish to limit the area and power cost associated with the prediction mechanism by limiting the number of bits for each counter. For example, counters with as few as three or four bits may be sufficient.

However, regardless of the size of the counter, there may be an issue that after a certain number of prediction training opportunities the train counter may become saturated and reach its maximum possible value (a saturation value). To address this, when the prediction state training circuitry increments the train counter associated with a given prediction trigger event in response to a prediction training opportunity associated with that given prediction trigger event, if incrementing the train counter would cause the train counter to overflow or to exceed the saturation value, the prediction state training circuitry may downscale both the train counter associated with a given prediction trigger event and at least one hit counter associated with the train counter for the given prediction trigger event. The hit counters which are downscaled may be any hit counters which track speculative actions which are recorded as options for being performed in response to encountering the given prediction trigger event. By applying a downscaling operation (e.g. a right shift) by an equivalent downscaling factor for both the train counter and the associated hit counters, this reduced the values of each of the counters in a way so as to (at least approximately) preserve the ratio between the hit counter and the train counter, so that the system can continue to monitor future prediction training opportunities with a reasonable degree of accuracy, without requiring the counters to be provided with an excessive number of bits. This improves power and circuit area efficiency by avoiding the need for excessively large counters.

When downscaling the at least one hit counter, the prediction state training circuitry may determine, based on the rounding toggle value, whether to apply a rounding increment to a downscaled value of the at least one hit counter. When a downscaling operation is performed, e.g. by right shifting the hit counter and the train counter, a least significant bit of the hit counter may be lost and so this may introduce occasional rounding errors. As the prediction mechanism is merely a speculative mechanism used to provide certain performance improvements, which does not affect the functional correctness of operations performed by the processing circuitry, this loss of accuracy may not generally be a problem. However, on average if the hit counter is always downscaled by truncating the lower bits then this may introduce a bias where more frequently occurring events may on average have lower hit counter values than the hit counter values for other events which have the same prediction success rate in reality but which occur less frequently and so encounter fewer downscaling events. One way to reduce the rounding bias may be to determine, when downscaling the hit counter, whether to apply a rounding increment based on a rounding toggle value which may switch state between successive downscaling events. For example the rounding toggle value could be obtained from a global counter which is shared between a group of train/hit counters (or is shared between all counters, in some examples) and which is incremented each time a downscaling operation is performed on a counter in the corresponding group. When the rounding toggle counter has a particular value then this may be an indication that a rounding increment should be applied, while when the rounding toggle counter has a different value then the rounding increment may not be applied. For example if the rounding toggle value is tracked using a one bit counter which is flipped in state each time a downscaling event occurs, this would allow the loss of precision due to rounding to stochastically occur only 50% of the time rather than always biasing towards truncating the lost bit of precision. This can help to improve accuracy.

In some examples the prediction state information may have a set of train counters corresponding to the different prediction trigger events for which training is being performed. In some implementations each train counter could be associated with only one hit counter corresponding to a particular speculative action that could be performed on encountering the prediction trigger event. However, in some cases it can be useful to track multiple different speculative actions associated with the same prediction trigger event. For example, for a prefetcher provided as the prediction circuitry, it could be useful for the different speculative actions to be different addresses for which prefetch requests can be issued in response to detecting the prediction trigger event, with each of those alternative prefetch addresses being associated with a separate hit counter, and each of those hit counters sharing the same train counter associated with the prediction trigger event at which the prefetch for the corresponding addresses may be initiated. Hence, it can be useful for the prediction state information to include two or more hit counters corresponding to a shared train counter, with each of the hit counters associated with a different speculative action capable of being selected by the prediction circuitry in response to the prediction trigger event associated with the shared train counter. In such an example, when evaluating the confidence metric to decide whether to initiate a speculative action, a number of different hit to train ratios may be identified based on the skewed versions of the respective hit counters and the skewed shared train counter, and the hit to train ratios for each of the alternative actions may be evaluated against a confidence threshold determined based on current system resource conditions, to determine whether to trigger any of these speculative actions.

In one example the prediction state information could include multiple types of hit counter, including at least a first type of hit counter and a second type of hit counter. In response to detection of a prediction hit for a first speculative action associated with a first type of hit counter, the prediction state training circuitry may determine whether or not to increment the first type of hit counter, where a first probability of the prediction state training circuitry determining that the first type of hit counter should be incremented in response to the prediction hit detected for the first speculative action is less than a second probability of the prediction state training circuitry determining, in response to detection of a prediction hit for a second speculative action associated with a second type of hit counter, that the second type of hit counter should be incremented. Hence, the first type of hit counter may be updated less frequently in response to occurrences of the corresponding prediction hit than the second type of hit counter. Effectively the second type of hit counter may be used to track a more valuable hit case than the first type of counter. This would mean that more occurrences of prediction hits associated with the first speculative action for the first type of hit counter would be required to reach a given level of confidence than the number of occurrences of the prediction hit for the second speculative action required for the second type of hit counter to indicate a certain level of the confidence. This approach can be useful to differentiate the fact that different speculative actions may be expected to provide different marginal increases in performance and so an action which is less likely to provide value may be slower to gain confidence that the prediction should be initiated. By updating one hit counter less frequently than another, even if the number of associated events if the same, then this enables the mechanism described above (for comparing the hit to train ratio against a confidence ratio threshold represented using the first and second skew values) to be applied even in cases where there are predictions of different relative value.

The current system resource conditions could be tracked in different ways. Performance monitoring circuitry may be provided to track the current resource conditions, for example by maintaining performance counters which count events which may be indicative of system resource being used. For example the current system resource conditions may be indicative of at least one of: memory system bandwidth utilization; cache capacity utilization; load/store buffer utilization; and processing pipeline utilization. Some implementations may consider only one of these types of resource conditions while others may consider more than one. The particular resource conditions to monitor (and performance parameters used to evaluate the conditions) may be selected for a given system implementation depending on the type of prediction mechanism being used.

In one example the prediction state training circuitry may select, from among a population of candidate events capable of acting as a prediction trigger event, a sampled subset of the candidate events to use as a prediction training opportunity when the prediction state training circuitry monitors subsequent events for training of the prediction state information. Such a predictive mechanism may be referred to as a sampling-based predictor, where to limit the power cost of performing the training, not all occurrences of prediction trigger events may actually be used to train the prediction state information. This may mean that some occurrences of a prediction trigger event which has a corresponding entry allocated in the prediction state information may be missed and so no monitoring is performed on that occasion to train the prediction state information. This approach may recognise the fact that the number of events occurring in a data processing system while processing instructions may be vast and so it may not be feasible to perform training on every event, when considering the power cost of performing monitoring of events and updating state information. Hence, such sampling-based prediction mechanisms can be useful to balance performance against circuit area and power costs, but they mean that training times taken to reach a sufficient level of confidence for some predictive actions may be long. For example, training times may be of the order of hundreds of thousands of processing cycles, which may mean that there may be a significant level of overconfidence or underconfidence in predictions which have not yet encountered sufficient training events due to the sampling. While one approach could be only to initiate speculative actions when an event has reached sufficient confidence having undergone the training, this may leave performance on the table due to effectively underestimating confidence for some useful predictions. On the other hand, if predictions were initiated early for all events even if they have not yet undergone sufficient training then this may lead to much waste of resource due to auctioning overconfident predictions. Hence, the technique discussed above where the action selection criterion to apply is varied based on system resource availability can be particularly useful for sampling-based prediction mechanisms, to reduce the problems caused by under and overconfidence which may be more prevalent for that type of prediction.

The approach discussed above can be applied to a number of different types of prediction mechanism. One example can be where the prediction circuitry is a prefetcher for predicting whether to prefetch, into a cache, data from a target address predicted based on the prediction state information. Hence, for the prefetcher the given speculative action may be initiating the request to prefetch the data from the target address into the cache. The prediction trigger event could be detecting that program execution has reached a program counter (instruction) address which matches a prefetch trigger address, or could be detecting that a memory access request has been issued to request a memory access to a data address which matches a prefetch trigger address. For the prefetcher, a prediction hit may be identified when a memory access to the predicted prefetch address is detected within a certain period of encountering the prediction trigger event. Hence, the technique discussed above can be useful for prefetchers (and in particular sampling-based prefetchers) to provide a better balance between performance and system resource utilisation for a given amount of circuit area and power cost in implementing the prefetcher.

However, the technique can also be applied to other types of predictors. For example, the predicting mechanism could be a load value predictor which is used to predict speculative values of data being loaded from memory so that subsequent instructions can be processed based on the speculative value before the data has actually been returned from memory. For such a load value predictor the given speculative action may be the processing of an instruction based on the speculative value of data to be loaded from memory, where the speculative value was predicted based on the prediction state information. The prediction trigger event could be program execution reaching the address of the instruction which loads the data value being predicted, or reaching the address of the instruction which is to be processed based on the speculatively predicted value. The prediction hit for this example could be detection that the data value loaded from memory once returned matched the speculative value predicted.

Another example of a predictor can be a dead block predictor which is used to predict, on eviction of victim data from a given level of cache, whether the victim data should be allocated to a further level of cache. Different data addresses may be associated with different access patterns, and while some addresses may be accessed at periodic intervals, so that even when evicted from one level of cache there is a reasonable probability that the data will be needed again in the near future, other data may be much more limited in its temporal access so that it may be needed for a time but subsequently the data may not be needed again in the program. A dead block predictor may learn to differentiate these types of behaviour for a given address so as to determine whether it is worth allocating victim data for that address into a further level of cache when evicted from an earlier level of cache, to try to preserve the cache capacity of the further level of cache for that data that is likely to be used again, which can help to improve performance for more frequently accessed data. Hence, for the dead block predictor, the prediction trigger event could be eviction of victim data associated with a particular memory address from a given cache and the given speculative action may be a prediction of whether or not that data should be allocated into the further level of cache. A prediction hit may occur in cases when the prediction indicated that the victim data should not be allocated into further level cache and then it was detected that there was no subsequent instance of accessing the address of the victim data again within a certain period after the eviction. The dead block predictor may be an example in which, as discussed above, it can be useful for predictions to become more aggressive when resource availability is scarce than when it is plentiful. For example with the dead block predictor if the cache utilisation or number of eviction events is relatively high, indicating high cache resource utilisation and hence low spare resource availability, it may be more desirable to increase the likelihood that the speculative action is triggered (so that the predictor suppresses the allocation of victim data into a further level cache) compared to when there is more spare capacity in the further level cache.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor an additional register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include an arithmetic/logic unit (ALU) 20 for performing arithmetic or logical operations; a floating-point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34. In this example the memory system include a level one data cache 30, the level one instruction cache 8, a level two cache 32 shared between instructions and data, a level three cache 34 (which may potentially be a shared system cache also shared with other processor cores) and main system memory 36. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as address translation or memory management mechanisms.

The apparatus 2 also has one or more prediction mechanisms for predicting whether or not to initiate a speculative action, based on prediction state information trained based on events observed during instruction processing by the pipeline 4.

For example, the apparatus 2 may have a prefetcher 40 for generating prefetch requests which request that data for a predicted prefetch address is prefetched into the level one instruction cache 8 or level one data cache 30 (or to another level of cache), without being directly requested by a load/store instruction executed by the execute stage 16 or by an instruction fetch from the fetch stage 6. For example, for a data prefetcher, the prefetcher 40 may analyse target addresses of load operations processed by the execute stage 16 and learn correlations between certain program counter addresses (instruction addresses representing a point in the program flow at which the prefetch may be generated) which may act as prefetch trigger events, and target addresses of subsequent loads following the prefetch trigger program counter value. By prefetching data into the level one data cache 30 ahead of the point where the data is actually requested by an executed instruction, this can reduce delays in handling the load instruction and hence improve performance.

Another example of a predictor may be a load value predictor 42 which predicts the data values to be loaded from the memory system before the load data has actually been received, so that subsequent instructions after the load can be executed earlier based on the predicted load value. If the prediction is correct then this allows the subsequent instructions which are dependent on a load to be processed faster, improving performance. If a misprediction occurs then a recovery operation can be triggered, to flush the pipeline of instructions after the mispredicted instruction and re-execute instructions from the mispredicted instruction based on the correct load value.

Another example of a prediction mechanism may be a deadblock predictor 44 which predicts whether data evicted from a certain level of cache (e.g. the level 2 cache 32) should be allocated into a further level of cache (e.g. the level 3 cache 34). Access patterns for some addresses may be relatively localised so that once the data is no longer being accessed frequently enough to justify the address being cached in the level 2 cache 32, then it may be relatively unlikely that the data will be needed again, and so allocating into the level 3 cache 34 may waste cache capacity and that capacity may be better used for other data. However, for other addresses the access patterns may be more distributed over time and there may be a higher likelihood that an address evicted from the level two cache may be needed afterwards to justify allocating into the level 3 cache 34. The deadblock predictor 34 can learn from previous patterns of cache eviction and allocation, to learn which addresses should exhibit the default behaviour so that they are allocated into the level three cache on an eviction from the level 2 cache 32, and which addresses may be speculatively assumed to not be required again and so a speculative action of suppressing allocations to level three cache may be performed based on the prediction state maintained by the dead block predictor 44. While this example describes the deadblock predictor 44 making predictions for controlling allocation into the level 3 cache, in other examples the deadblock predictor 44 could make predictions for controlling allocation into another level of cache.

It will be appreciated that the various types of predictor 40, 42, 44 shown in FIG. 1 are just some examples and other types of predictors could also be provided, for predicting other types of speculative action which may be performed when it is not certain whether that action will be beneficial but which if it turns out the speculative action would be beneficial then this can provide a performance gain. While FIG. 1 shows an example of a system comprising all three of the types of predictor 40, 42, 44 mentioned above, this is not essential and some systems may only have one or more of these types of predictor. For example, some systems could have a prefetcher 40 but may not have a load value predictor 42 or dead block predictor 44.

The apparatus 2 also has system resource condition monitoring circuitry 50 for monitoring utilisation of system resource within the data processing system. For example, the system resource condition monitoring circuitry 50 may maintain a set of performance counters which may count occurrences of various events which can be used to determine whether system resource utilisation is high or low. As discussed in more detail below, the predictor 40, 42, 44 may vary one or more action selection criteria used to select which action should be performed (and which may also be used to select whether a speculative action should be performed at all) based on the current system resource conditions monitored by the system resource condition monitoring circuitry 50. For example the system resource condition monitoring circuitry 50 could include performance counters for tracking memory system bandwidth utilisation, for example counting the number of requests that are pending, the number of cache misses or evictions, or other events which may give an indication of the level of load imposed on the memory system as a whole. Note that while FIG. 1 shows the memory system 36 being accessed by a single CPU pipeline 4, it is also possible that the memory 36 may be shared between multiple processor cores and so the current memory system load may also depend on the operation of those other processor cores. Other system resource conditions that could be monitored by the system resource condition monitoring circuitry may include cache capacity utilisation, load/store buffer utilisation (representing the level of utilisation of load/store buffers used by the load/store unit 28 to queue pending load requests or store requests awaiting processing) and processing pipeline utilisation (e.g. the level of occupancy of an instruction queue within the issue stage 12 or (if the pipeline is an out of order pipeline capable of executing processing operations in a different order to the program order in which the corresponding program instructions are defined), utilisation of a reorder buffer for tracking completion of the out of order executed instructions or micro operations.

Figure 2:
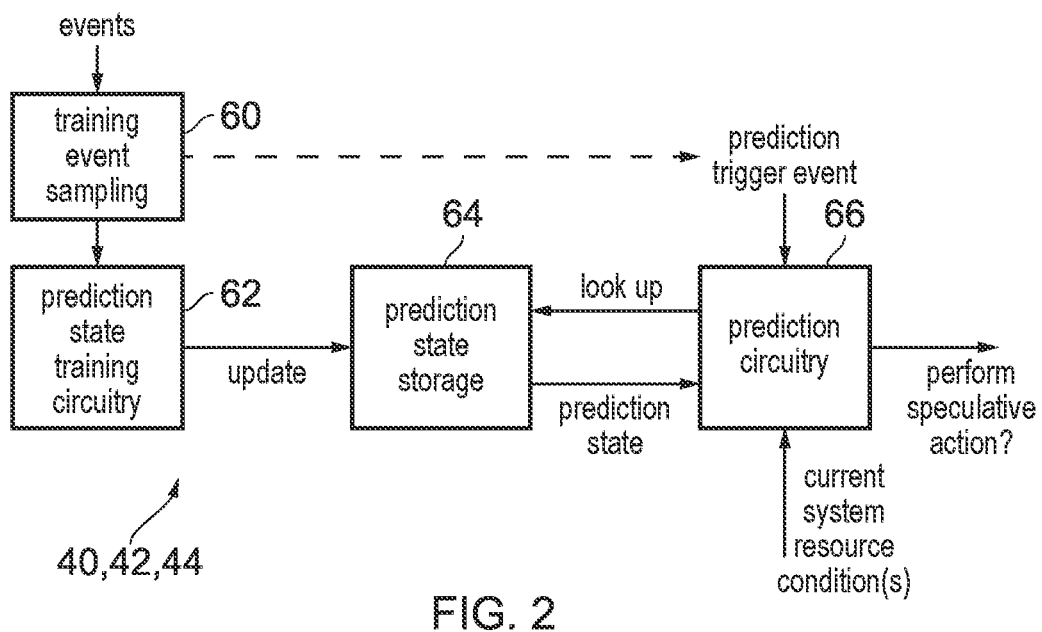
FIG. 2 shows an example of prediction circuitry.

FIG. 2 shows in more detail part of the predictor, which could be any one of the examples 40, 42, 44 shown in FIG. 1. The predictor 40, 42, 44 includes training event sampling circuitry 60, prediction state training circuitry 62, prediction state storage circuitry 64 and prediction circuitry 66.

The training event sampling circuitry 60 selects, from among a pool of candidate events occurring during processing of instructions by the pipeline 4, a sampled subset of events to use as prediction training opportunities. For example, each instruction or micro-operation processed by the pipeline could be a possible candidate event (or for some predictors, the candidate events may be restricted to instructions or micro operations of a one or more particular types, e.g. load instructions only for the load value predictor 42). However, performing training for every such candidate event could incur a great power cost, and so to limit the power consumption and complexity of the predictor, the training event sampling circuitry 16 may select a proper subset of these events to use as prediction training opportunities. When an event is selected as a prediction training opportunity, the prediction state stored in the prediction state storage 64 is updated based on events monitored subsequent to the selected candidate event in the sampled subset.

For example, the training event sampling circuitry 60 could maintain a sampling counter which is incremented or decremented on each candidate event, and when the counter expires on reaching a certain threshold value (or is decremented to zero) then the next candidate event may be selected to use as a prediction training opportunity and the counter may then be reset to an initialisation value to start counting another sampling interval. In some examples, random perturbation may be applied to the sampling interval (the number of candidate events required between successive samples being taken), to vary the length of the sampling interval from time to time. This reduces the likelihood that the sampled events are unrepresentative of the program behaviour as a whole (e.g. reducing the risk of the training event sampling circuitry 60 selecting samples at the same point of a loop on each iteration of the loop). For example, in approach which decrements the sampling counter in response to each candidate event, the initialisation value of the counter could be randomly perturbed about a mean value, to make it less likely that the sampling is locked to the same point of the loop each time a sample is selected.

When an event is selected by the training event sampling circuitry 60 then the prediction state training circuitry 62 may update prediction state information associated with that event in the prediction state storage circuitry 64, based on observations of the outcome of the event selected as the prediction training opportunity and/or subsequent events such as the outcomes of subsequently executed instructions or the addresses of load requests subsequently issued to the memory system. For example, for the prefetcher 40 the event selected as the prediction training opportunity could be the execution of an instruction at a given program counter address or issuing of a load to a certain target address, and the subsequently monitored events could be the addresses of subsequent loads in a period after the prediction training opportunity is identified. The prediction state information can be trained to indicate addresses of subsequently seen loads and to boost confidence in previously seen addresses if they are encountered again. In general, the prediction state training circuitry 62 may update the prediction state to boost confidence in successful predictions as to future events which could be used as a basis for initiating a speculative action, and reduce confidence in indicated predictions which turn out to be unsuccessful.

The prediction circuitry 66 is used to lookup the prediction state storage 64 in response to encountering a certain prediction trigger event during processing of instructions by the pipeline 4. For example the prediction trigger event could be program execution reaching a certain program counter address or the detection of a load to a certain target address in memory, or for the dead block predictor could be the eviction of data for a certain target address from the level two cache 32 for example. When a prediction trigger event occurs then the prediction circuitry initiates a lookup of the prediction state storage 64 to determine whether the prediction state storage includes any prediction state information associated with that prediction trigger event, and if there is a hit for that prediction trigger event then the prediction state is used to determine whether to initiate a speculative action, and if any speculative action is to be issued, which speculative action should be performed. The decision on whether to initiate a particular speculative action is based on whether at least one action selection criterion is satisfied, which is at least in part informed by the prediction state information and which varies based on the current system resource conditions monitored by the system condition monitoring circuitry 50. For example the prediction circuitry 66 may vary the selection criterion used so that a more relaxed action selection criterion is applied to the prediction state information when current system resource conditions indicate greater system resource availability than when the current system resource conditions indicate less system resource availability. For example, a confidence threshold could be higher when system resource availability is more constrained than when system resource availability is more available.

As shown in the dotted line in FIG. 2, in some implementations the prediction trigger events used by the prediction circuitry 66 to initiate a lookup to the prediction state storage 64 may be the same events as the training events selected by the training event sampling circuitry 60. That is, when the training event sampling circuitry 60 selects a training event as a training opportunity, then in addition to initiating updating the prediction state based on monitoring of events subsequent to that training event, the training event may also be used as a prediction trigger event for looking up the prediction state storage 64, so if the prediction state storage 64 already specifies prediction state which indicates that there is a speculative action which meets the action selection criteria based on the current system resource conditions, then that speculative action can be triggered in response to the prediction trigger event. Hence, while shown separately in FIG. 2, in some implementations the lookups of the prediction state storage 64 for updating the prediction state during training and for looking up the prediction state to determine whether to perform a speculative action may be performed in a single lookup. However, in other implementations it may be possible for the prediction circuitry 66 to use, as the prediction trigger events for causing a prediction to be performed, a different subset of the overall population of events to the subset selected as the training sample by the training event sampling circuitry 60. For example, events may be selected as prediction trigger events for predictions at a more frequent interval than events being selected for training. Hence, it will be appreciated that different implementations may make different choices as to which particular events are selected for use as training opportunities and which events are selected for lookup for a trigger event to determine whether to perform a speculative action.

Figure 3:
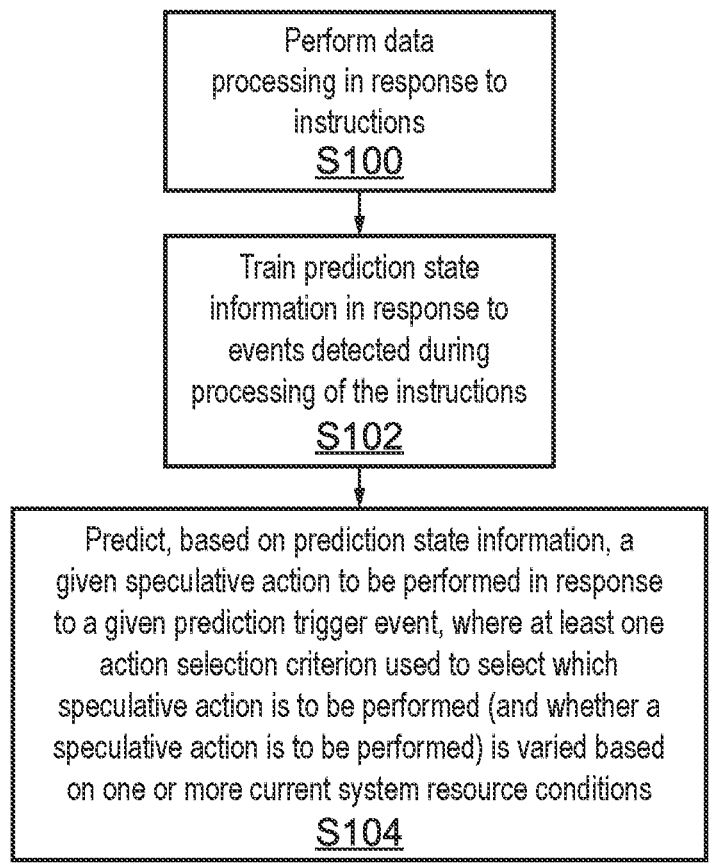
FIG. 3 is a flow diagram illustrating a method including varying an action selection criterion used by the prediction circuitry based on current system resource conditions.

FIG. 3 illustrates a flow diagram showing a method performing data processing using the system comprising a predictor. At step S100 the processing pipeline 4 performs data processing in response to instructions. At step S102 prediction state information stored in the prediction state storage circuitry 64 is trained in response detected during processing of the instructions. At step S104 prediction circuitry 66 predicts, based on the prediction state information, a given speculative action to be performed in response to a given prediction trigger event. At least one action selection criterion used to select which speculative action is to be performed (and to select whether a speculative action is to be performed) is varied based on the one or more current system resource conditions monitored by the system resource condition monitoring circuitry 50.

Figure 4:
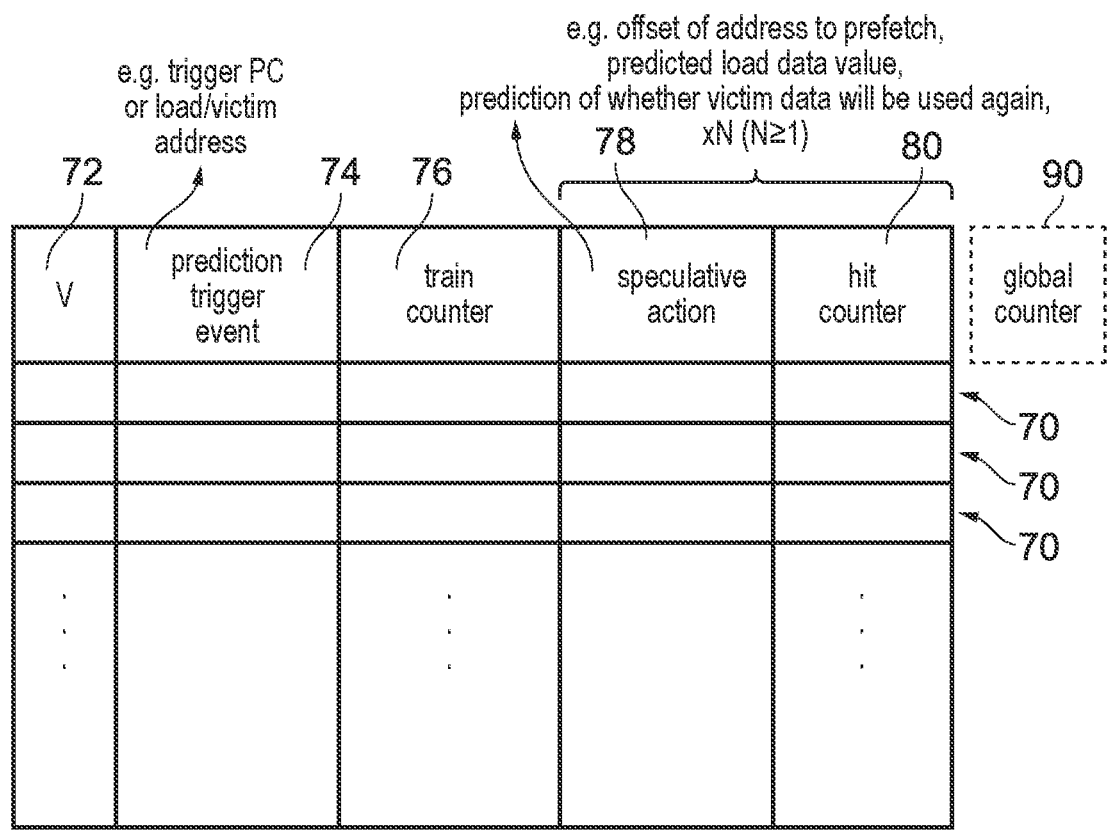
FIG. 4 illustrates an example of prediction state information used to generate the prediction.

FIG. 4 shows an example of the prediction state information stored by the prediction state storage circuitry. The prediction state storage 64 stores a number of prediction state entries 70 each corresponding to a particular prediction trigger event. Each entry 70 includes a valid field 72 for indicating whether the entry contains valid information, a prediction trigger event field 74 for indicating information identifying the corresponding prediction trigger event, a train counter 76 for counting a number of training opportunities, and at least one set of fields representing a corresponding speculative action which is available for selection as a prediction to be made in response to encountering the prediction trigger event. For each speculative action represented in the prediction state entry 70, the entry comprises a speculative action identifying field 78 for storing information associated with a speculative action which can be used to control what action to perform and a corresponding hit counter 80 for counting the number of prediction hits when an event associated with the corresponding speculative action was detected during a period of training following a prediction training opportunity for the corresponding prediction trigger event recorded in field 74. The number of different speculative actions represented in one entry 70 may vary depending on the implementation. FIG. 4 shows the general case where a certain number N of speculative actions is specified in one entry 70. N may be any integer equal to or greater than one. In implementations which record multiple speculative actions as different options available for selection in response to the same prediction trigger event, this can provide greater likelihood that a successful prediction can be made.

The prediction trigger event field 74 may store any information that can be used to identify whether an event detected during processing of instructions corresponds to an event previously used for training, or whether an event has occurred which may cause a speculative action to be performed. For example the identifier stored in field 74 could be the program counter address (instruction address) of an instruction which when encountered in the executed instruction stream is treated as the prediction trigger event, or could be a load address which identifies an address which indicates that a prediction trigger event should be detected when a load operation processed by the load/store unit 28 specifies that load address as its target address. If the predictor is the dead block predictor 44 then the information in the prediction trigger event field 74 could be the victim address of data evicted from the level two cache 32, so that when data from that address is evicted again then this is detected as matching the prediction trigger event. Other types of predictor may have a different definition of the information in the prediction trigger event field 74.

The train counter 76 counts the number of prediction training opportunities encountered for the prediction trigger event 74. The prediction training opportunities are instances when the corresponding trigger event recorded in field 74 was detected at a time when detection of the given prediction trigger event causes the prediction state training circuitry 62 to monitor events subsequent to the prediction trigger event for training of prediction state information in the corresponding entry 70. For example, the train counter 76 may be incremented when an event corresponding to the information in field 74 is selected as a sample training opportunity by the training event sampling circuitry 60.

The speculative action field 78 may record any information which can be used by the prediction circuitry 66 to decide what speculative action to issue. For example, for the prefetcher 40 the speculative action identifier could be an indication of an address to be specified in a prefetch request issued to the memory system to request prefetching of data associated with a specified prefetch address. The prefetch address could be represented as an absolute address, or (to reduce the size of the speculative action identifier field 78) as an offset relative to the address specified as the prediction trigger event information in field 74. For the load value predictor 42, the speculative action identifier field 78 may indicate the data value predicted to be loaded from memory for a load operation associated with a program counter address in prediction trigger event field 74. For the dead block predictor 44 the speculative action identifier field 78 may provide an indication of whether or not the victim data associated with the address specified in the prediction trigger event field 74 is likely to be used again, so as to indicate whether or not it should be allocated into the level 3 cache 34 on eviction from the level two cache 32.

The hit counter 80 counts the number of prediction hits associated with the corresponding speculative action indicated in speculative action identifier field 78. Here a prediction hit refers to one of the prediction training opportunities (counted by the train counter 76) for the corresponding prediction trigger event recorded in field 74 for which the prediction state training circuitry, when monitoring events subsequent to that prediction trigger event, detected an event associated with a given speculative action. The event associated with the given speculative action may be any event which indicates that it would have been beneficial to perform the speculative action 78 in response to encountering the prediction trigger event recorded in field 74. For example, for the prefetcher 40 the hit counter 80 can be incremented when, subsequent to a training opportunity being selected corresponding to the prediction trigger event recorded in step 74, a subsequent load or instruction fetch is detected which specifies as its target address an address corresponding to the offset or address recorded in the speculative action field 78. For the load value predictor the increment or hit counter 80 could occur when the load instruction identified in the prediction trigger event field 74 loads a data value matching the predicted load value recorded in the speculative action field 78. For the dead block predictor 44 the prediction hit may occur when, following eviction from the level two cache 32 of data associated with the victim address recorded in the prediction trigger event field 74, no subsequent access to the same address occurs within a certain period after that eviction. Other types of predictor may define the prediction hit scenario in a different manner, depending on the type of prediction being made.

For a given pair of a prediction trigger event and a given speculative action, a confidence metric indicative of a level of confidence in the prediction, which can be used to determine whether the given speculative action should be triggered following detection of the given prediction trigger event, can be represented by the ratio of the corresponding hit counter 80 to the corresponding train counter 76. This establishes a hit-to-train ratio of the number of prediction hits to the number of prediction training opportunities, which can be a useful metric for assessing the level of prediction accuracy required to justify initiating the speculative action for a given level of system resource utilisation. This enables a variable threshold ratio to be established for comparing against the hit-to-train ratio.

Figures 5, 6:
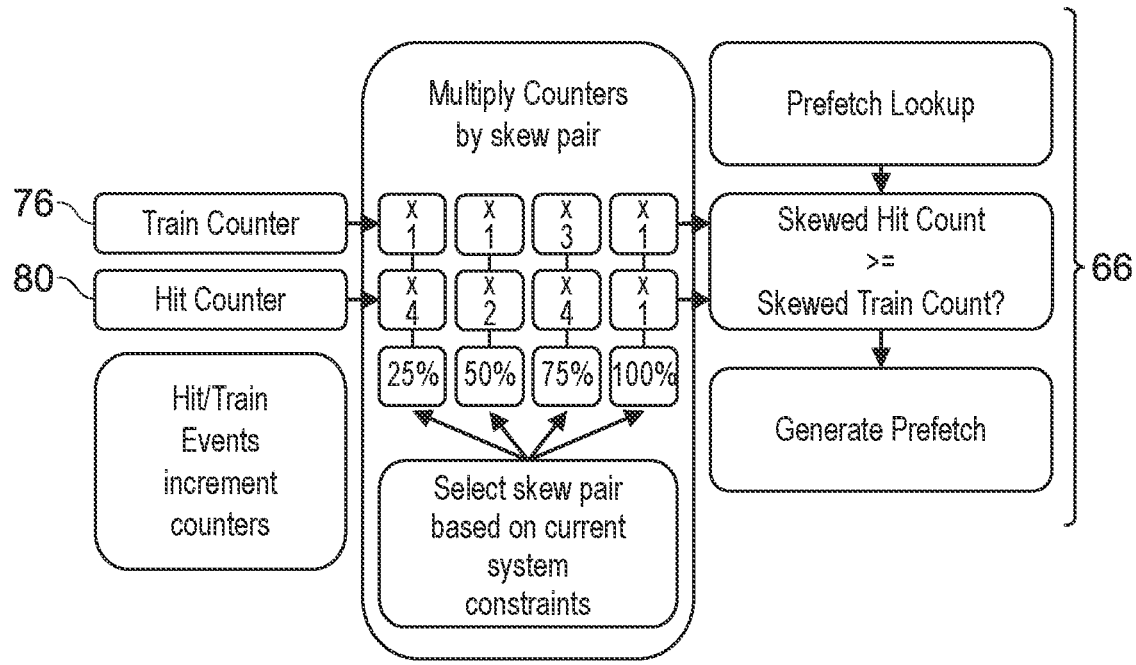
FIG. 5 shows an example of a prefetcher using hit and train counters to determine whether to generate a prefetch request.
FIG. 6 is a table showing an example of reacting to changes in system resource availability.

FIG. 5 schematically illustrates how the hit counter 80 and train counter 76 can be used to determine whether to initiate a speculative action. FIG. 5 explains the use of these counters in the context of a prefetcher 40, but it will be appreciated that a similar approach can also be used for other types of predictors, where the type of speculative action and prediction trigger event may be different, but the train counter and hit counter can still be used in the same way as shown in FIG. 5. Instead of incrementing and decrementing a simple confidence counter in response to train hits or train misses, the train counter 76 is incremented at the beginning of a training period of monitoring events to a prediction trigger event, and the hit counter 80 is incremented on a training hit. This creates a ratio of training hits to training misses. As shown in FIG. 5, pairs of skew values are defined to multiply the hit count and train count by to skew the prefetch aggressiveness up or down in response to system constraints. Which pair of system constraint skew values is used is determined at confidence calculation time, allowing instant response to system constraints. Each pair of skew values includes a first skew value used to multiply the hit counter 80 and a second skew value used to multiply the train counter 76. After skewing, if the skewed hit count is greater than or equal to the skewed train count, that prediction is considered confident and so the corresponding prefetch can be generated.

Effectively, the prediction circuitry 66 may evaluate whether the hit-to-train ratio H/T is greater than or equal to an accuracy ratio A/B, where B is the first skew value used to multiply the hit counter 80 and A is the second skew value used to multiply the train counter 76. As the relation HIT≥A/B can be rewritten as H*B≥T*A, the comparison of the skewed hit and train counts provides an indication of whether the estimated predicted success rate H/T is higher or lower than some target success rate A/B selected based on current system constraints. In this example, there are four skew pairs available for selection based on current system constraints, representing threshold confidence ratios of 25% (A=1, B=4), 50% (A=1, B=2), 75% (A=3, B=4) and 100% (A=1, B=1) respectively. However, other implementations may use skew values defining different thresholds or could provide a greater or smaller number of skew value pairs available for selection. The prediction circuitry 66 may select which skew value pair to use, based on performance counters maintained by system resource condition monitoring circuitry 50, e.g. a counter which tracks memory system bandwidth utilisation.

FIG. 6 shows a worked example showing how the predictor may respond to changes in system resource utilisation and training and hit events during training of the prediction state to vary whether prefetches would be generated if another instance of the branch prediction trigger event occurs.

In the example of FIG. 6, initially the train counter 76 and hit counter 80 for a certain pair of prediction trigger event and speculative action are set at T=2 and H=1 respectively, indicating that two previous prediction training opportunities were encountered and one of those two prediction training opportunities has so far been detected as encountering a prediction hit when the corresponding speculative action is deemed to have been desirable (the period of monitoring may still be ongoing for the second prediction training opportunity counted by train counter 76). The current system resource conditions are relatively unconstrained and so the system constraint threshold of 25% accuracy is currently selected, which means that the skew pair A:B of 1:4 is selected. Hence, when evaluating whether to generate a prefetch or other speculative action, the skewed train counter indicating the product T*A of the train counter T and the second skew value A is 2, and the skewed hit counter representing the product H*B of the hit counter H and the first skew value B is 4, so as H*B>T*A, in this instance the prefetch would be generated.

Subsequently, as shown in the second row of the table in FIG. 5, system resource utilisation increases and the system becomes more constrained, so based on the monitoring by the system resource condition monitoring circuitry 50 the next highest accuracy threshold of 50% is selected leading to a skew pair of 1:2 being selected. This reduces the skewed hit value H*B to 2 on future lookups of the prediction circuitry, but as H*B=T*A=2, the prefetch would still be generated in this instance.

However if the system subsequently becomes even more constrained, leading to the 75% threshold being selected as the skew pair, then (without needing any further retraining of the prediction state information) the skew pair of 3:4 would be selected and now T*A=6 and H*B=4, and so as H*B<T*A, no prefetch would be generated on a lookup of this entry. This is useful because as system resource utilisation increases, it may be less desirable to initiate speculative actions based on a relatively low level of confidence. While the level of confidence represented by the 50% prediction success rate (H/T=0.5) may been sufficient to justify initiating the prefetch when system resource utilisation was lower, once the system gets more constrained it may be preferred to reserve any use of bandwidth for more confident predictions with a hit-to-train ratio H/T greater than or equal to the higher threshold of 75%.

As shown in the fourth row of the table in FIG. 6, if while the system resource utilisation maintains at a level so that the 75% skew pair is selected, a prediction hit is detected for the speculative action associated with the hit counter, then the hit counter H is incremented to 2 and now the skewed hit counter H*B=8 and the skewed train counter T*A is 6, so once more the prefetch would be generated if a prediction lookup is made at this time. This is because the detected prediction hit means that prediction confidence metric has increased (the ratio of hits to training opportunities is now 100% as H/T=1, which is greater than the selected system constraint-based threshold of 75%).

As shown in the fifth row of FIG. 6, the system then becomes even more constrained so that the maximum ratio threshold of 100% is selected, and so now a 1:1 skew pair is selected. In this instance again the skewed hit counter H*B is still equal to the skewed train counter T*A and so the prefetch or other speculative action is still generated.

However, as shown in the sixth row of FIG. 6 if a subsequent training event is detected for this prediction trigger event but no hit is detected then the increment to the train count while the system constraint threshold of 100% remains active means that the skewed train counter T*A is now 3, and as this is greater than the skewed hit counter H*B no prefetch would be generated. As shown in the final row of FIG. 6, when the system constraint is later reduced to the 50% threshold as the system becomes less constrained, then the 1:2 skew pair would again be selected, and based on H=2, T=3, A=1, B=2, once more prefetches would be generated because H*B=4 is greater than T*A=3.

Hence, FIG. 6 shows how this design of predictor can incorporate a much higher degree of reactivity to external system constraints without needing retraining of the prefetcher, which can be particularly useful for sampling-based prefetchers as shown in FIG. 2 which have very long training times (in the order of 100s of 1000s) of processor cycles. This provides a better balance between performance and resource utilisation, avoiding waste of scarce resource on overconfident predictions while also avoiding missed performance opportunities in cases when resource is more plentiful.

The hit and train counters 80, 76 may be implemented using relatively few bits, e.g. a 3-bit counter for both the hit counter and the train counter. The train counter 76 may be provided once per prediction state entry 70 while the hit counters 80 may be provided once per speculative action recorded in the entry (i.e. N hit counters in total as shown in FIG. 4). Neither counter rolls over. Instead, the hit counter may saturate at a maximum value (e.g. 7 for a 3-bit counter). When the train counter reaches the saturation value (e.g. 7) and needs to be incremented again, both the train counter 76 and the N hit counters 80 in the same entry 70 are downscaled, e.g. by setting the train counter to the next lowest power of 2 smaller than the saturation value (e.g. 4 for a 3-bit counter) and right shifting each hit counter 80 down by one bit position. This approximately preserves the ratio between the two counters. For example, for 3-bit counters, a ratio of 8/4 would become 4/2, 8/7 would become 4/3, etc. To reduce the loss of accuracy incurred by rounding errors in downscaling the hit counter, a rounding toggle value may be provided that flips state on each down shift. If that rounding toggle is set, we keep the lowest bit of the hit counter (adding a rounding increment of 1 to the downscaled value), while if the rounding toggle is not set the rounding increment is not added. This allows us to stochastically lose precision only 50% of the time, rather than always biasing towards truncating the lost bit of precision.

In one example, the updates to the hit/train counters 80, 76 may be performed based on functions equivalent to the functions indicated in the following pseudocode snippets:

```
// performed when training opportunity identified (e.g. when program counter matches
// address in prediction trigger event field 74):
if(pht[i].pc == extract_tag(trigger_pc) ){
    pht[i].train_cnt += 1;
    // increment train counter, saturating at a maximum value, e.g. 7 for a 3-bit counter.
}
// performed when training hit is identified, e.g. when load is performed to address matching
// specified offset in speculative action field 78 during period of monitoring after training
// opportunity
if(offset == pht[entry].offset[i]){
    pht[entry].hit_cnt[i] += 1;
    // increment hit counter associated with matching offset, saturating at maximum value
    // e.g. 7 for a 3-bit counter.
}
```

```
// confidence check example at time of making prediction
if(pht[i].hit_cnt[j]* hit_coeff >= pht[i].train_cnt * train_coeff && pht[i].hit_cnt[j] > 1) {
  // generate the prefetch for this offset if H*A >= B*T AND the hit counter is non-zero.
}
// when training counter is full, right shift hit counter, losing lower bit half the time
pht[i].hit_cnt[j] = (pht[i].hit_cnt[j] >>1) + (pht[i].rounding_toggle && pht[i].hit_cnt[j] & 1);
pht[i].rounding_toggle = !pht[i].rounding_toggle;
//reset training counter to next lowest power of 2 below saturation value (e.g. 4 for 3-bit
counter).
pht[i].train_cnt = 0b100;
```

It will be appreciated that, while this pseudocode shows one way of implementing the operations performed on the counters, other examples could use different operations.

Figure 7:
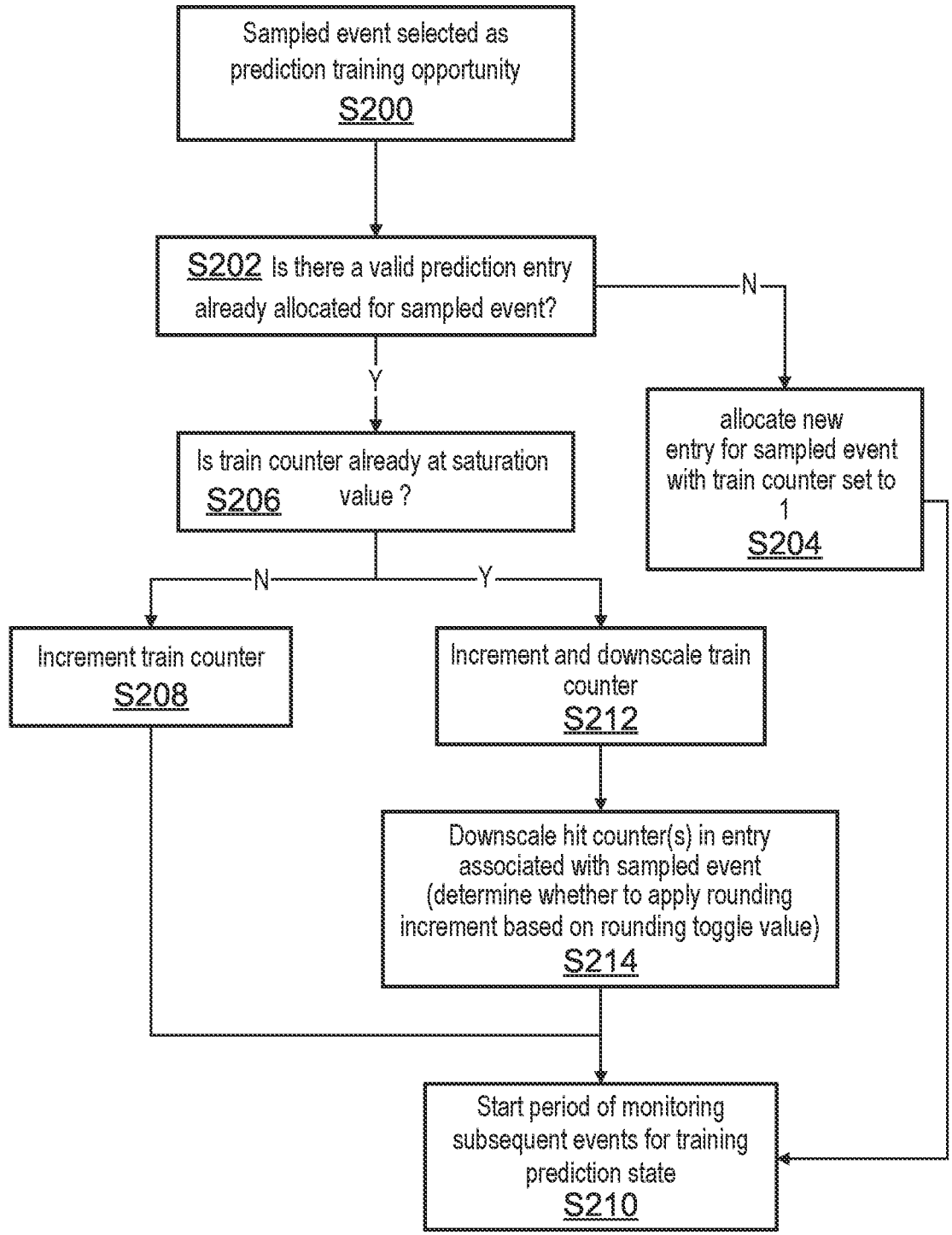
FIG. 7 is a flow diagram showing a method of training prediction state information, comprising updating the train counter in response to identification of a prediction training opportunity.

FIG. 7 shows a flow diagram showing operations performed for training of prediction state. At step S200 a sampled event is selected as a prediction training opportunity by the training event sampling circuitry 60 (e.g. this may occur on expiry of a sampling counter). At step S202 the prediction state training circuitry 62 determines whether there is already a valid prediction entry allocated in the prediction state storage circuitry 64 corresponding to the sampled event. If not then at step S204 the prediction state training circuitry 62 allocates a new entry 70 for the sampled event, setting the valid indicator 72 to indicate that the new entry is valid, setting the prediction trigger event field 74 to indicate information about the sampled event and initialising the train counter 76 of the new entry to 1 and the corresponding hit counter(s) 80 to 0. At step S210 the prediction state training circuitry 62 starts monitoring subsequent events for a period after the sampled event. The length of that period may be implementation-defined.

If, at step S202, it was determined that there was already a valid prediction entry 70 allocated to the sampled event, then at step S206 the prediction state training circuitry 62 determines whether the corresponding train counter 76 in the valid entry 70 is already at its saturation value. If not, then at step S208 the train counter 76 is incremented and at step S210 the training circuitry 62 again starts monitoring subsequent events for training of the prediction state. If at step S206 it was determined that the train counter was already at the saturation value then at step S212 the prediction state training circuitry 62 increments and downscales the train counter 76 of the valid entry 70 (or, equivalently, writes a predetermined downscaled value to the train counter 76—e.g. for a 3-bit counter incremented from a saturation value of 7 to 8 and then downscaled to 4 by right-shifting one bit position, there is no need to actually increment the counter and instead it is sufficient simply to write the predetermined value of 4 (0b100) to the counter). At step S214, the prediction state training circuitry 62 also downscales N hit counters in the same entry 70 as the associated with the sampled event (N>=1). When downscaling the hit counter(s), then as described above the prediction state training circuitry 62 determines whether to apply a rounding increment, based on a current value of a rounding toggle value. The rounding toggle value is also updated to switch states when a downscaling event occurs at step S214. The rounding toggle value flips states between each successive downscaling to vary whether or not the least significant bit of the downscaled hit counter is preserved or discarded when right shifting for downscaling, to provide more statistically representative values for the hit counter which reduces systematically bias towards lower values over time. By downscaling both the train counter 76 and the associated hit counters 80 this approximately preserves the ratios between the hit counter and the train counter and enables counting to continue so that it is not necessary to maintain counters with a very large number of bits merely to maintain precision. After the downscaling has been done then at step S210 a period of monitoring subsequent events for training prediction state starts as was described following steps S204 or S208.

Figure 8:
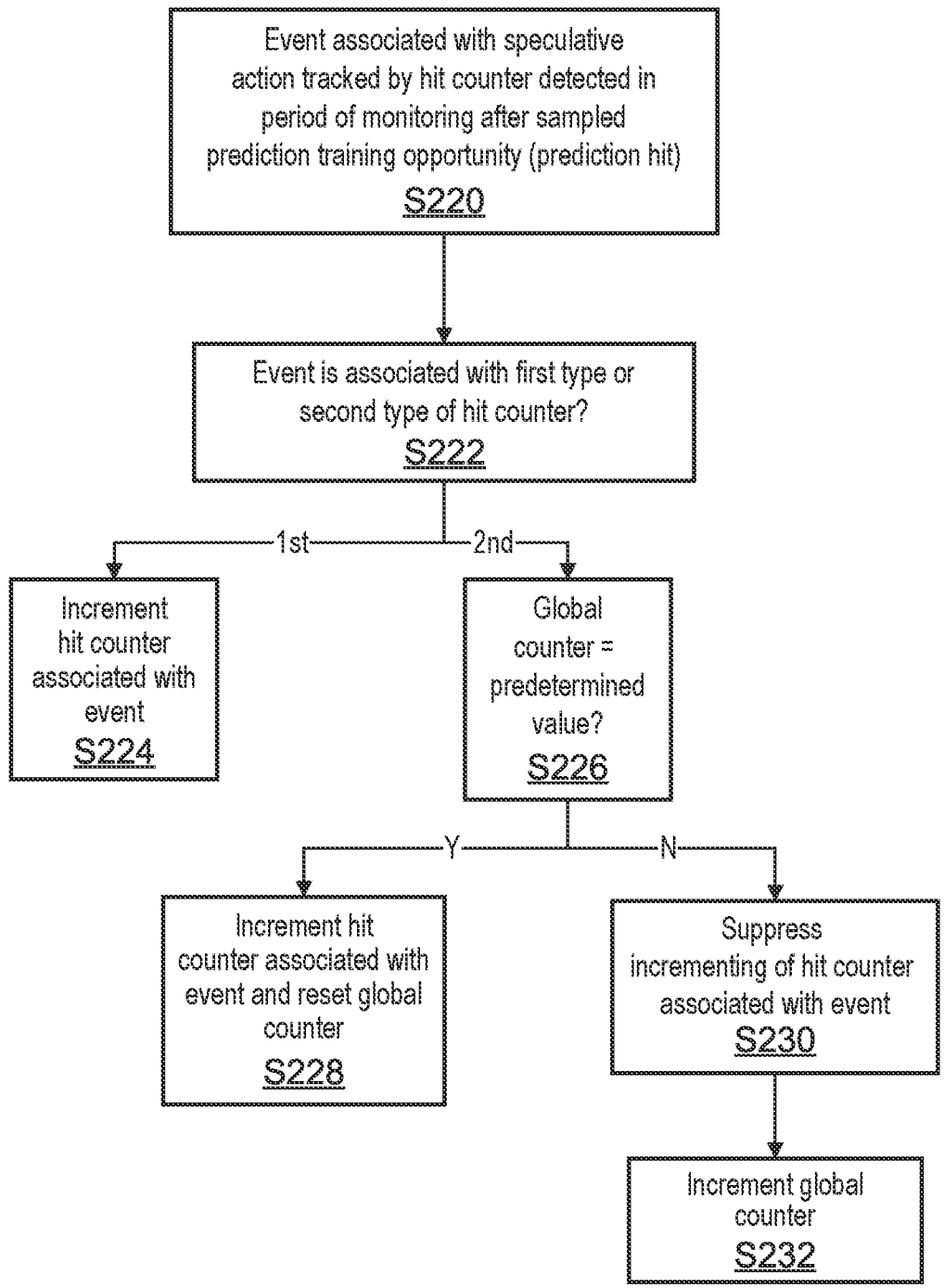
FIG. 8 is a flow diagram showing another part of the training for updating a hit counter.

FIG. 8 shows a flow diagram showing another part of the training, showing operations performed by the prediction state training circuitry 62 when an event associated with a particular speculative action is detected. At step S220 an event associated with a speculative action that is being tracked by a particular hit counter 80 in a particular entry 70 is detected. This event is detected in the period of monitoring that started at step S210 of FIG. 7 when a prediction training opportunity was selected. The detection of the event associated with the speculative action at step S220 is an example of a prediction hit. The detected event could for example be the issuing of a load to an address represented in the speculative action field 78, in the case where the prediction is a prefetcher, or the issuing of a load for which the return data value matches the data value recorded in the speculative action field 78. In cases where an event is detected during the period of training which does not match any of the available speculative actions in valid fields 78 provided in the entry 70 associated with the previously detected trigger event used as a training opportunity, then if there is a spare speculative action field that has not already been filled then this can be populated with information about the speculative event that occurred (e.g. in some examples the prediction entry 70 could include additional action valid fields per speculative action which indicates which speculative action fields 78 are valid).

When an event is detected at step S220 that can be regarded as a prediction hit for a particular speculative action recorded in field 78 for a given entry 70 then at step S222 the prediction state training circuitry 62 may determine whether the event is associated with a first type of hit counter or a second type of hit counter. These different types of hit counters may represent prediction hits of different values where the first type of hit counter may track a more valuable prediction case than the second hit counter. If the event is associated with a first type of hit counter then at step S224 the hit counter associated with a detected event is incremented. On the other hand, if the event is associated with a second type of hit counter then at step S226 the prediction state training circuitry detects whether a global counter 90 (shown in FIG. 4) has a predetermined value. The global counter 90 may be shared between all prediction entries 70 for controlling frequency of updates of the second type of hit counter. For example, if the global counter 90 is a 2-bit counter, it may be used to record how many of a less valuable "prediction hit" event have been seen, so that the associated hit counter 80 itself is only incremented every fourth time that event is observed. In contrast, the first type of hit counter tracking a more valuable prediction case may be incremented each time the corresponding event is observed. Hence, the probability of updating the first type of hit counter would be 1/1 and the probability of updating the second type of hit counter when a relevant event occurs would be 1/4.

Hence, if at step S226 the global counter has the predetermined value (e.g. its maximum value, e.g. 0b11 for a 2-bit counter), then at step S228 the hit counter associated with the event detected at S220 is incremented and the global counter 90 is reset to its initial value. On the other hand if the global counter did not have the predetermined value at step S226 then at step S230 the prediction state training circuitry 62 suppresses incrementing of the hit counter 80 of the second type that is associated with the event detected at step S220, and at step S232 increments the global counter 90. This approach means that a greater number of events tracked by the second type of hit counter may be required to result in an increment of the second type of hit counter than the number of events tracked by the first type of counter that are required to trigger an increment of the hit counter. By updating the different types of hit counters at different frequencies (with different probabilities of update), this means that the likelihood of a given action being selected for being performed speculatively may be weighted to be more probable towards some actions compared to others to ensure that less common actions which are more likely to be mispredicted may require a greater level of confidence before they initiate speculative actions while still fitting within the overall framework of using the skewed hit and train counters as discussed earlier.

Figure 9:
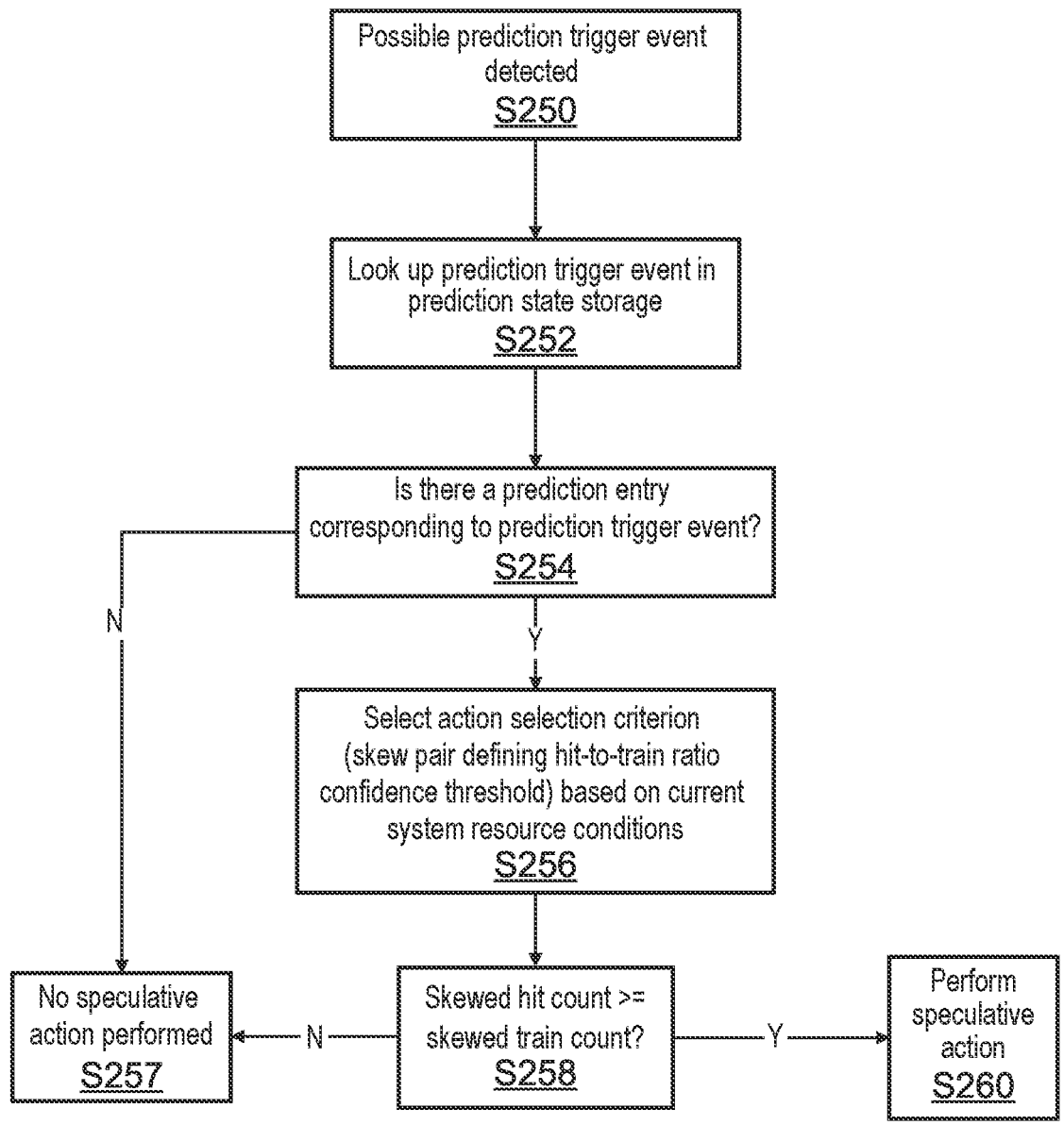
FIG. 9 is a flow diagram showing use of the hit and train counters for determining whether to perform a speculative action.

FIG. 9 shows a flow diagram showing lookup of the prediction state information to determine whether the perform a speculative action. As step S250 a possible prediction trigger event is detected. As mentioned above, in some cases the detection of the prediction trigger event may be the same as the selecting of an event as a prediction training opportunity as shown in FIG. 7, so in that case when the sampling circuitry selects an event then it is both used for subsequent training and also used to lookup previous state to determine whether to initiate a speculative action. However, it is also possible that the population of prediction trigger events used for prediction lookups could be different to the population of events selected as training opportunities.

When a prediction trigger event is detected then at step S252 the prediction circuitry 66 looks up the event in the prediction state storage 64. At step 254 the prediction circuitry 66 determines whether there is a valid entry 70 which specifies that prediction trigger event in field 74, and if not then at step S257 no speculative action may be performed (if the prediction trigger event was also selected as a training opportunity, the prediction state training circuitry 62 may allocate a new entry 70 for that prediction trigger event and commence subsequent training as shown in FIGS. 7 and 8).

If at step S254 it is determined that there is a valid prediction entry corresponding to the prediction trigger event detected at step S250, then at step S256 an action selection criterion to be applied to the prediction state information for that valid entry is selected based on current system resource conditions. For example as discussed above a pair of skew values A, B defining a hit-to-train ratio confidence threshold A/B may be selected. At step S258 the action selection criterion is applied to select whether any speculative action is triggered and if so which action. In particular, the prediction circuitry 66 may determine a skewed hit count equivalent to a product between the hit counter 80 for a given speculative action and a first skew value and determine whether this is greater than or equal to a skewed train counter corresponding to the product between the train counter 76 in the looked up entry 70 and a second skew value selected at value S256 based on the current system resource conditions. If the skewed hit counter H*B is greater than or equal to the skewed train counter T*A then at step S260 a speculative action is performed while if the skew hit counter is less than the skewed train counter than at step S257 no speculative action is performed on this occasion (although again some training may occur if the prediction trigger event is also selected as a training opportunity).

Hence, this provides way of allowing the prediction mechanism to respond to rapid changes in system resource conditions which may change many times between successive training of the prediction state. By considering the system resource conditions at the point of making the prediction as shown in FIG. 9 rather than at the point of adjusting confidence metrics, this provides greater reactivity to system conditions.

In the examples discussed above the action selection criterion was whether or not a confidence metric (in particular a hit to train ratio) is greater than a confidence threshold and the confidence threshold was varied based on current system resource conditions.

Figure 10:
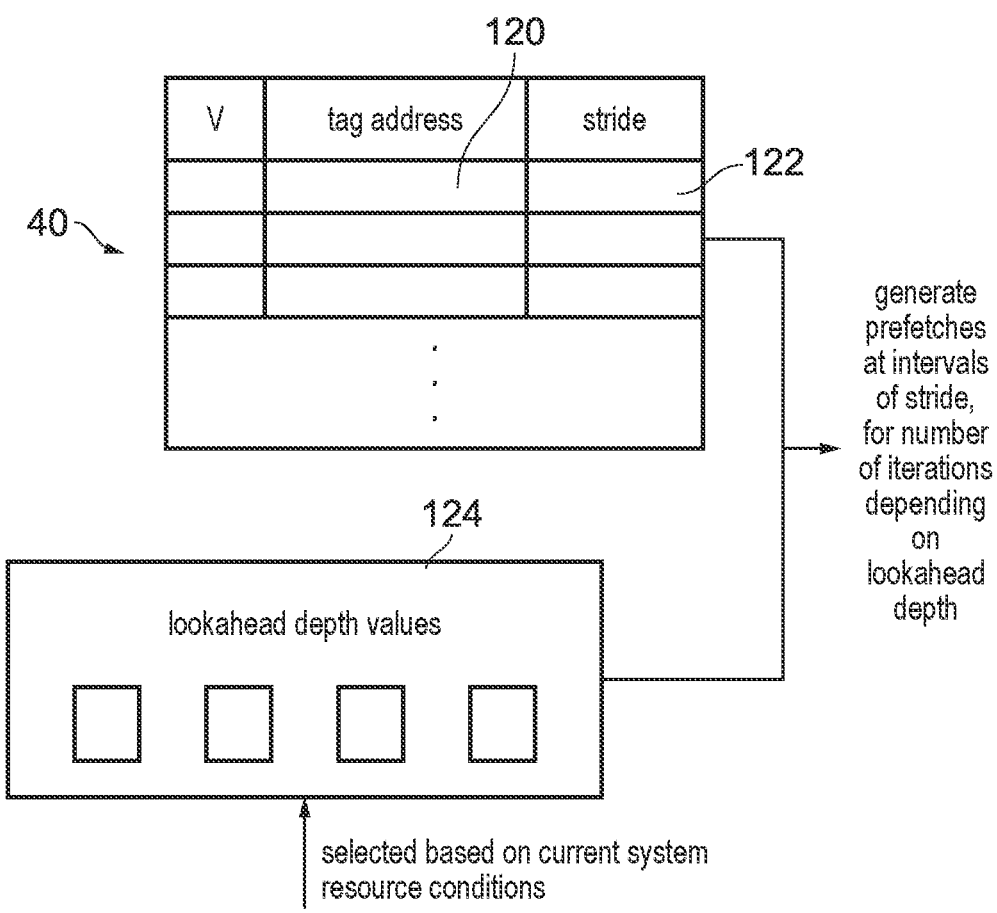
FIG. 10 shows a further example of prediction circuitry which varies a lookahead depth for determining which speculative actions to perform, based on current system resource conditions.

However, as shown in FIG. 10, it is also possible to vary other types of actions selection criterion based on current system resource conditions. For example, FIG. 10 shows a stride-based prefetcher 40 which includes entries mapping a tag address 120 to a stride value 122, where the tag address 120 represents a target address of a given load operation and the stride value 122 represents a predicted stride (offset) between two successive load addresses in a series of subsequent loads expected to follow on from the given load targeting addresses at increasing intervals of the predicted stride. Hence, when encountering a load whose target address matches the tag address 120 in a given valid entry, the prefetcher 40 may then generate a series of subsequent prefetch requests corresponding to various addresses which increase at intervals of the specified stride value 122. The number of iterations for which the stride 122 is applied to the tag address 120 may be variable based on one of several look ahead depth values 124 which may be selected based on the current system resource conditions monitored by system resource condition monitoring circuitry 50. At times of more constrained resource availability the prefetcher may not look as far ahead as at times of more plentiful resource, to avoid overloading the limited resource available. Hence, a lookahead depth value 124 that indicates that a greater number of recursive prefetches should be generated may be selected at times of greater resource availability, while a lookahead depth value 124 indicating a smaller number of recursive prefetches may be selected when there is less resource available. Effectively, the lookahead depth value can be seen as a threshold number of prefetch requests, defining the maximum number of prefetch requests ahead of the current point of processing that should be generated. In other words, the decision of whether to generate a given prefetch fora given address in the stride sequence may depend on whether the offset between the current load address and the given address is less than the threshold number of multiples of the stride value. Again, by scaling the action selection criterion used to select which prefetches to generate based on current system resource conditions, the prefetcher can avoid placing additional stress on limited resource, but at times of greater resource availability may benefit from performance opportunities by performing more aggressive prediction making it more likely that predictive actions are generated.

Another example may provide an apparatus comprising: processing circuitry to perform data processing in response to instructions; prediction state storage circuitry to store prediction state information; prediction state training circuitry to train the prediction state information in response to events detected during processing of instructions by the processing circuitry; and prediction circuitry to predict, based on the prediction state information, a given speculative action to be performed in response to a given prediction trigger event; in which: the prediction circuitry is configured to determine whether to perform the given speculative action based on a hit-to-train ratio represented by the prediction state information, where the hit-to-train ratio indicative of a ratio of a number of prediction hits to a number of prediction training opportunities, the prediction training opportunities comprise instances of detecting the given prediction trigger event when detection of the given prediction trigger event causes the prediction state training circuitry to monitor events subsequent to the given prediction trigger event for training of prediction state information associated with the given prediction trigger event; and each prediction hit comprises one of the prediction training opportunities for which the prediction state training circuitry, when monitoring the events subsequent to the given prediction trigger event, detected an event associated with the given speculative action.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
processing circuitry to perform data processing in response to instructions;
prediction state storage circuitry to store prediction state information;
prediction state training circuitry to train the prediction state information in response to events detected during processing of instructions by the processing circuitry; and
prediction circuitry to predict, based on the prediction state information and at least one action selection criterion, a given speculative action to be performed in response to a given prediction trigger event; in which:
the at least one action selection criterion comprises whether a confidence metric represented by the prediction state information exceeds a confidence threshold, and the confidence metric is indicative of a hit-to-train ratio of a number of prediction hits to a number of prediction training opportunities,
the prediction training opportunities comprising instances of detecting the given prediction trigger event when detection of the given prediction trigger event causes the prediction state training circuitry to monitor events subsequent to the given prediction trigger event for training of prediction state information associated with the given prediction trigger event; and
each prediction hit comprising one of the prediction training opportunities for which the prediction state training circuitry, when monitoring the events subsequent to the given prediction trigger event, detected an event associated with the given speculative action.

2. The apparatus according to claim 1, in which the prediction circuitry is configured to vary the confidence threshold based on the one or more current system resource conditions.

3. The apparatus according to claim 1, in which the at least one action selection criterion comprises whether a lookahead depth associated with the speculative action is greater than a lookahead depth threshold; and
the prediction circuitry is configured to vary the lookahead depth threshold based on the one or more current system resource conditions.

4. An apparatus comprising:
processing circuitry to perform data processing in response to instructions;
prediction state storage circuitry to store prediction state information;
prediction state training circuitry to train the prediction state information in response to events detected during processing of instructions by the processing circuitry; and
prediction circuitry to predict, based on the prediction state information, a given speculative action to be performed in response to a given prediction trigger event; in which:
the prediction state information comprises, for the given prediction trigger event and the given speculative action:
a train counter indicative of a number of prediction training opportunities associated with the given prediction trigger event, the prediction training opportunities comprising instances of detecting the given prediction trigger event when detection of the given prediction trigger event causes the prediction state training circuitry to monitor events subsequent to the given prediction trigger event for training of prediction state information associated with the given prediction trigger event; and
a hit counter indicative of a number of prediction hits, each prediction hit comprising one of the prediction training opportunities for which the prediction state training circuitry, when monitoring the events subsequent to the given prediction trigger event, detected an event associated with the given speculative action.

5. The apparatus according to claim 4, in which, in response to the given prediction trigger event, the prediction circuitry is configured to predict whether to perform the given speculative action based on whether a skewed hit counter is greater than a skewed train counter, the skewed hit counter corresponding to a product of a first skew value and the hit counter associated with the given speculative event, and the skewed train counter corresponding to a product of a second skew value and the train counter associated with the given prediction trigger event.

6. The apparatus according to claim 5, in which the prediction circuitry is configured to select the first skew value and the second skew value based on the one or more current system resource conditions.

7. The apparatus according to claim 4, in which in response to a prediction training opportunity associated with the given prediction trigger event, the prediction state training circuitry is configured to increment the train counter associated with the given prediction trigger event; and when incrementing the train counter would cause the train counter to overflow or exceed a saturation value, the prediction state training circuitry is configured to downscale the train counter associated with the given prediction trigger event and downscale at least one hit counter associated with the train counter associated with the given prediction trigger event.

8. The apparatus according to claim 7, in which, when downscaling the at least one hit counter, the prediction state training circuitry is configured to determine, based on a rounding toggle value, whether to apply a rounding increment to a downscaled value of the at least one hit counter.

9. The apparatus according to claim 4, in which the prediction state information comprises a plurality of hit counters corresponding to a shared train counter, each of the plurality of hit counters associated with a different speculative action that is capable of being selected by the prediction circuitry in response to the prediction trigger event associated with the shared train counter.

10. The apparatus according to claim 4, in which the prediction state information comprises a plurality of types of hit counter;

in response to detection of a prediction hit for a first speculative action associated with a first type of hit counter, the prediction state training circuitry is configured to determine whether or not to increment the first type of hit counter, where a first probability of the prediction state training circuitry determining that the first type of hit counter should be incremented in response to the prediction hit detected for the first speculative action is less than a second probability of the prediction state training circuitry determining, in response to detection of a prediction hit for a second speculative action associated with a second type of hit counter, that the second type of hit counter should be incremented.

11. The apparatus according to claim 1, in which the prediction state training circuitry is configured to select, from among a population of candidate events capable of acting as a prediction trigger event, a sampled subset of the candidate events to use as a prediction training opportunity when the prediction state training circuitry is configured to monitor subsequent events for training of the prediction state information.

12. The apparatus according to claim 1, in which the given speculative action comprises a request to prefetch, into a cache, data from a target address predicted based on the prediction state information.

13. The apparatus according to claim 1, in which the given speculative action comprises processing of an instruction based on a speculative value of data to be loaded from memory, the speculative value predicted based on the prediction state information.

14. The apparatus according to claim 1, in which the given speculative action comprises, on eviction of victim data from a given cache, suppressing allocation of the victim data to a further level cache.

15. The apparatus according to claim 1, in which the prediction circuitry is configured to vary the at least one action selection criterion based on one or more current system resource conditions of the apparatus.

16. The apparatus according to claim 15, in which the one or more current system resource conditions are indicative of at least one of:
memory system bandwidth utilization;
cache capacity utilization;
load/store buffer utilization; and
processing pipeline utilization.

17. The apparatus according to claim 15, in which the prediction circuitry is configured to vary the at least one action selection criterion to apply a more relaxed action selection criterion when the one or more current system resource conditions indicate greater system resource availability than when the one or more current system resource conditions indicate less system resource availability.

18. A method comprising:
performing data processing in response to instructions;
training prediction state information stored by prediction state storage circuitry in response to events detected during processing of the instructions; and
predicting, based on the prediction state information and at least one action selection criterion, a given speculative action to be performed in response to a given prediction trigger event, wherein
the at least one action selection criterion comprises whether a confidence metric represented by the prediction state information exceeds a confidence threshold, and
the confidence metric is indicative of a hit-to-train ratio of a number of prediction hits to a number of prediction training opportunities,
the prediction training opportunities comprising instances of detecting the given prediction trigger event when detection of the given prediction trigger event causes the prediction state training circuitry to monitor events subsequent to the given prediction trigger event for training of prediction state information associated with the given prediction trigger event; and
each prediction hit comprising one of the prediction training opportunities for which the prediction state training circuitry, when monitoring the events subsequent to the given prediction trigger event, detected an event associated with the given speculative action.

* * * * *